(12) United States Patent
Kim

(10) Patent No.: US 7,386,314 B2
(45) Date of Patent: Jun. 10, 2008

(54) DATA TRANSMITTING METHOD FOR OPPORTUNITY DRIVEN MULTIPLE ACCESS (ODMA) SYSTEM

(75) Inventor: Young Woong Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 981 days.

(21) Appl. No.: 10/419,516

(22) Filed: Apr. 21, 2003

(65) Prior Publication Data

US 2004/0072568 A1    Apr. 15, 2004

(30) Foreign Application Priority Data

Oct. 15, 2002   (KR)   ...................... 10-2002-0062959

(51) Int. Cl.
*H04Q 7/20*   (2006.01)
(52) U.S. Cl. ...................... 455/445; 455/448
(58) Field of Classification Search ................ 375/211; 455/7, 445, 448
See application file for complete search history.

(56) References Cited

U.S. PATENT DOCUMENTS 7,092,434 B2 *   8/2006   Moon et al. ................ 375/211

FOREIGN PATENT DOCUMENTS

JP      2001-292093     10/2001
WO     WO 00/54539     9/2000

OTHER PUBLICATIONS

Young-Woong Kim, et al; "A Novel Adaptive Routing Scheme for the QoS-Based Multimedia Services in Mobile Ad-Hoc Networks"; 396-400 (Apr. 1999).

* cited by examiner

*Primary Examiner*—William J. Deane, Jr.
(74) *Attorney, Agent, or Firm*—Lee, Hong, Degerman, Kang & Schmadeka

(57) ABSTRACT

A mobile communication system for communicating data with various priorities is provided. The system comprises a transmitting device for transmitting data having a transmission priority, an object mobile communication terminal designated for receiving the data; and a plurality of intermediate mobile communication terminals, wherein at least one of said plurality of intermediate mobile communication terminals receives the data from the transmitting device, determines the priority of the data, and forwards the data to the object mobile communication terminal via a particular communication path based on the priority of the data.

12 Claims, 4 Drawing Sheets

DATA TRANSMITTING METHOD FOR OPPORTUNITY DRIVEN MULTIPLE ACCESS (ODMA) SYSTEM

CROSS REFERENCE TO RELATED APPLICATION

Pursuant to 35 U.S.C. § 119(a), this application claims the benefit of earlier filing date and right of priority to Korean Patent Application No. 2002-62959, filed on Oct. 15, 2002, the content of which is hereby incorporated by reference herein in its entirety.

BACKGROUND OF THE INVENTION

1. Field of the Invention

The present invention relates to an opportunity driven multiple access (ODMA) system and, particularly, to a data transmission method for the ODMA system which controls transmission power according to data priority in the ODMA system.

2. Description of the Related Art

Recently, interest and demand for mobile communication services have dramatically increased. Various mobile communication services are provided to users having mobile communication terminals. Some mobile communication service include multimedia services such as data and motion picture information, as well as voice information. Accordingly, much research in the area of communication technologies and mobile communication terminals is being performed.

Generally, a cellular system divides a large service area into a plurality of small cells, covered by base stations for managing the cells. The base stations are installed in respective cells not to interfere with each other. The base stations are disposed at a distance so that radio waves do not interfere. Same frequency is not used for adjacent cells.

Since respective base stations are connected to a central control station and to a switching station, when a mobile terminal crosses over a cell boundary, this cross over can be detected and speech status can be monitored by transmitting/receiving connection control information of mobile terminals in other cells, as well as the mobile terminal in its cell. When the mobile terminal moves to another cell, the active traffic channel is changed to a frequency channel corresponding to the new cell, to compete a hand-off.

A cell centering around a base station can be divided into a high speed data area and a low speed data area. When a mobile terminal in the cell moves further away from the base station and reaches the cell boundary area, a lot of path loss occurs. Therefore, when the mobile terminal has moved at a certain distance from the base station, it is difficult to transmit the data with high speed and the speech quality is lowered due to the path loss.

Figure 1:
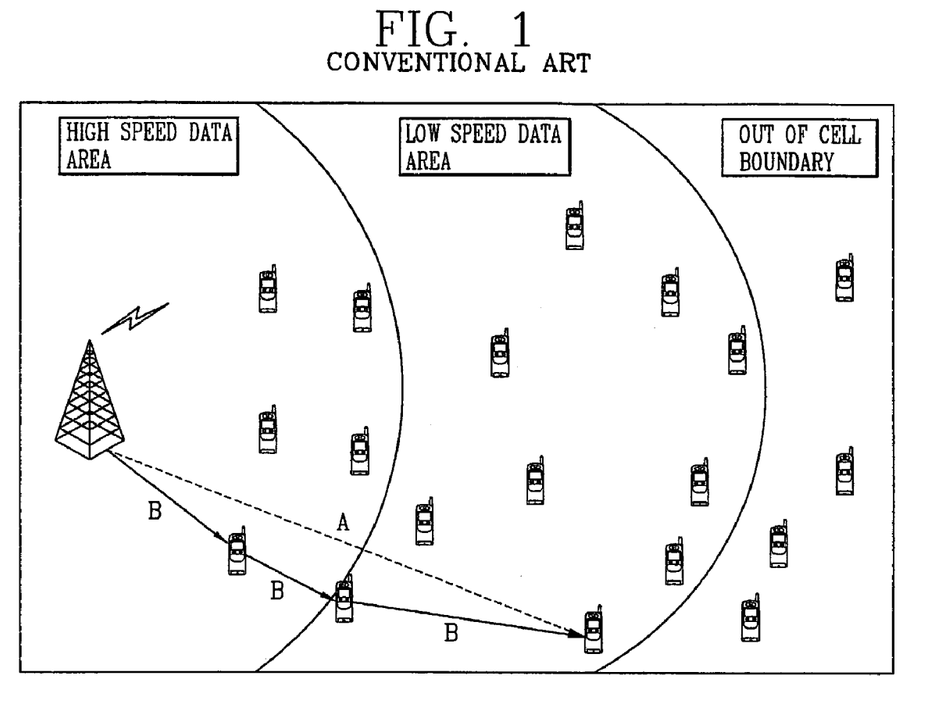
FIG. 1 illustrates a mobile communication system according to the conventional art.

FIG. 1 is a view showing a mobile communication system according to the conventional art, and illustrating a method for providing a mobile terminal near the cell boundary with the data service in a cellular environment.

Dotted line A shows the data transmission in a general cellular mobile communication system, wherein the base station transmits the data directly to an object terminal. Since the mobile terminal in the cell boundary area is far away from the base station, much transmission loss is generated during data transmission, and thereby data transmission rate is lowered and error rate is increased. Therefore, it is difficult to provide high speed data service to a mobile terminal which is far away from the base station, and accordingly, only low speed data service can be provided.

In addition, when the mobile terminal receives the data, the terminal requires a received power more than a certain degree. Accordingly, when the base station transmits the data to the mobile terminal which is far away from the base station, the base station should use a strong transmission power to correspond the received power. Unfortunately, a strong transmission power may interfere with a mobile terminal connected to an adjacent base station, and may affect the speech quality.

Since resources are limited in a radio environment, minimum transmission power should be used, when possible. However, when the mobile terminal requiring multimedia service at high receiving rate and low error rate moves to the cell boundary area, the interference for the other users in the cell may be increased and the speech quality may be lowered. Therefore, a more efficient and effective method for managing radio link resources is needed.

In order to solve the problems of general cellular system, many researches for providing multimedia service of high speed in an IMT-2000 system are being performed, for example, an opportunity driven multiple access (ODMA) system has been introduced.

The ODMA system is a system made by applying concepts of ad-hoc network to a mobile communication system, and transmits the data through various hops for increasing efficiency of universal mobile telecommunications system (UMTS), and thereby, constructing a larger high speed data service area. The ODMA is a protocol for relaying communication information between terminals so that the data communication at high speeds can be maintained even in the cell boundary area.

Referring to FIG. 1, line B illustrates a method for transmitting data in an ODMA system according to the conventional art. As shown therein, when the base station transmits the data to the mobile terminal in the cell boundary area, the base station transmits the data through a plurality of hops. In the ODMA system, the high speed data service area can be expanded with a small transmission power, and therefore, the ODMA system is effective in view of power consumption comparing to the conventional cellular system transmitting the data directly to the distant mobile terminal.

Generally, the multimedia data transmitted between the mobile terminals has various attributes such as delay-sensitive voice and picture communication requiring real-time transmission, and file transmission which does not require the real-time transmission.

However, the conventional ODMA system uses uniform transmission power regardless of the delay sensitivity or the traffic attributes of the data transmitted/received between terminals, and thereby it is difficult to provide multimedia data services having various attributes.

SUMMARY OF THE INVENTION

In accordance with one aspect of the invention, a method for transmitting data in an opportunity driven multiple access (ODMA) system comprises: receiving data transmitted from a communication device; detecting a traffic attribute of the data; and transmitting the data to a neighboring mobile communication terminal in a selected path defined by the traffic attribute. A search message is exchanged between one or more mobile communication terminals in the path to determine the availability of neighboring mobile communication terminals. The search message comprises a list of neighboring mobile communication terminals, ID of a transmitting terminal transmitting the data, ID of a receiving terminal for receiving the data, transmission power, and information about the neighboring mobile communication terminals in the path, for example.

The search message may be a reference in a connectivity table utilized by an intermediate mobile communication terminal situated in a path between the transmitting terminal and the receiving terminal. In some embodiments, the connectivity table is updated at predetermined time intervals, wherein time information at each update interval is stored in a timestamp. The traffic attribute comprises information that indicates the data is delay-sensitive data, for example.

In certain embodiments, data is transmitted to a neighboring terminal having a first transmission power, if the traffic attribute indicates that the received data has a first delay sensitivity; otherwise the data is transmitted to a neighboring terminal having a second transmission power, if the traffic attribute indicates that the received data has a second delay sensitivity.

In other embodiments, data is transmitted to a neighboring terminal in a first transmission distance, if the traffic attribute indicates that the received data has a first delay sensitivity; or the data is transmitted to a neighboring terminal in a second transmission distance, if the traffic attribute indicates that the received data has a second delay sensitivity.

In certain embodiments, the data is transmitted to a first terminal for delay-sensitive data, if the traffic attribute indicates that the received data has a first delay sensitivity; and the data is transmitted to a second terminal, if the traffic attribute indicates that the received data has a second delay sensitivity.

In accordance with another embodiment, a method for transmitting data in an ODMA system comprises: determining an object terminal to which data is to be transmitted; identifying whether or not a receiving neighboring terminal receiving the data is the object terminal; identifying a traffic attribute of the received data, if the terminal is not the object terminal; transmitting the data to a first neighboring terminal having a first transmission power, when the traffic attribute indicates real-time traffic; and transmitting the data to a second neighboring terminal having a second transmission power, when the traffic attribute indicates non real-time traffic.

A search message including information about one or more neighboring mobile terminals, for example, is transmitted between the one or more neighboring mobile terminals. The search message is a reference in a connectivity table utilized by an intermediate mobile communication terminal situated in a path between a transmitting terminal and a receiving terminal, in the ODMA system. The connectivity table is updated at predetermined time intervals. In certain embodiments, the first and second transmission powers are proportional to transmission distance between the receiving neighboring terminal and the first and second neighboring terminals.

In accordance with yet another embodiment, a mobile communication system for communicating data with various priorities comprises: a transmitting device for transmitting data having a priority, an object mobile communication terminal designated for receiving the data; and a plurality of intermediate mobile communication terminals wherein at least one of said plurality of intermediate mobile communication terminals receives the data from the transmitting device, determines the priority of the data, and forwards the data to the object mobile communication terminal via a particular communication path based on the priority of the data.

The particular communication path may comprise one or more neighboring terminals, wherein an attribute embedded in the data indicates a magnitude defining the priority of the data. If the magnitude is higher than a first threshold then the data is forwarded to the object mobile communication terminal via a first communication path. For example, if the magnitude is lower than a second threshold then the data is forwarded to the object mobile communication terminal via a second communication path. For example, if the data is of a first priority, then the data is forwarded via a first communication path.

The first communication path may comprise one or more neighboring terminals with high transmission power. The second communication path may comprise one or more neighboring terminals with low transmission power. In some embodiments, the first communication path comprises one or more neighboring terminals that are at least a first distance apart, wherein the first distance is larger than a predetermined threshold. The second communication path may comprise one or more neighboring terminals that are at most a second distance apart. The second distance is smaller than a predetermined threshold.

A search message is circulated among the plurality of intermediate mobile communication terminals to collect identifying information about each of the plurality of intermediate mobile communication terminals. The collected identifying information indicates respective transmission power for each intermediate terminal.

The collected identifying information is used by each intermediate mobile communication terminal to select the particular communication path for a received data, based on the priority of the data. If the data is of high priority, then the selected communication path comprises intermediate terminals with high transmission power. If the data is of low priority, then the selected communication path comprises intermediate terminals with low transmission power. In one or more embodiments, the number of intermediate terminals in the selected communication path is inversely proportional to magnitude of the priority of the data, wherein a higher priority data is identified by a larger magnitude.

Thus, a mobile communication terminal for communicating data with various priorities to an object mobile communication terminal is provided, wherein the mobile communication terminal receives the data, determines the priority of the data, and forwards the data to the object mobile communication terminal via a communication path based on a priority of the data.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

One or more embodiments of the invention comprise an opportunity driven multiple access (ODMA) system is a kind of UMTS system for improving transmitting function of a system. The data is transmitted to an object terminal through a plurality of hops, and therefore, a high speed data area is expanded and a high speed data service is provided to a terminal in a low speed data area. A hop corresponds to a neighbor of the mobile terminal which receives the data.

Figure 2:
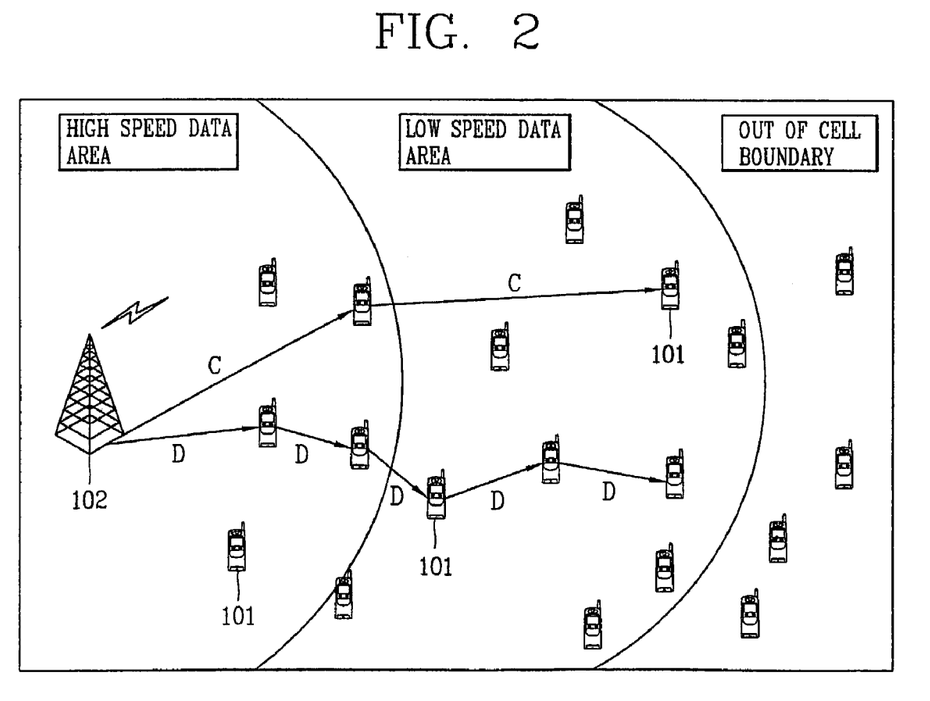
FIG. 2 illustrates an ODMA system according to one or more embodiments of the invention.

FIG. 2 shows an ODMA system according to the present invention, and illustrates a method for transmitting data to a mobile terminal located in a cell boundary area. As shown therein, the ODMA system comprises a plurality of mobile terminals 101 spread in a cell area, and a base station 102 controlling the mobile terminals 101 through connection control information and speech control information of the respective mobile terminals 101 and transmitting/receiving data simultaneously.

The mobile terminal 101 can be classified into a combined terminal which is able to transmit/receive real-time data and non real-time data; or an exclusive terminal for real-time data which is able to transmit/receive only real-time data; or an exclusive terminal for non real-time data which is able to transmit/receive only non real-time data.

Among the data transmitted from the base station 102 to the mobile terminal 101, messages requiring real-time transmission are transmitted through the least number of neighboring terminals 101 using a high transmission power, as represented in line C. As such, routing delay can be reduced and the high speed data area can be expanded near the cell boundary. That is, the number of neighboring terminals 101 functioning as repeaters is minimized, and thereby the routing delay generated in respective repeaters can be reduced. Therefore, the data can be transmitted rapidly so as to correspond to traffic attributes required by real-time transmission.

As shown in line D, the data is transmitted through a plurality of neighboring terminals 101 using a low transmission power in case of non real-time transmission which is not sensitive for delay, and thereby a high speed data area can be expanded. At that time, routing delay is increased as the number of neighboring terminals 101 functioning as the repeaters is increased. However, the data is transmitted a plurality of times through a short distance, and thereby entire transmission power consumption is reduced.

Figure 3:
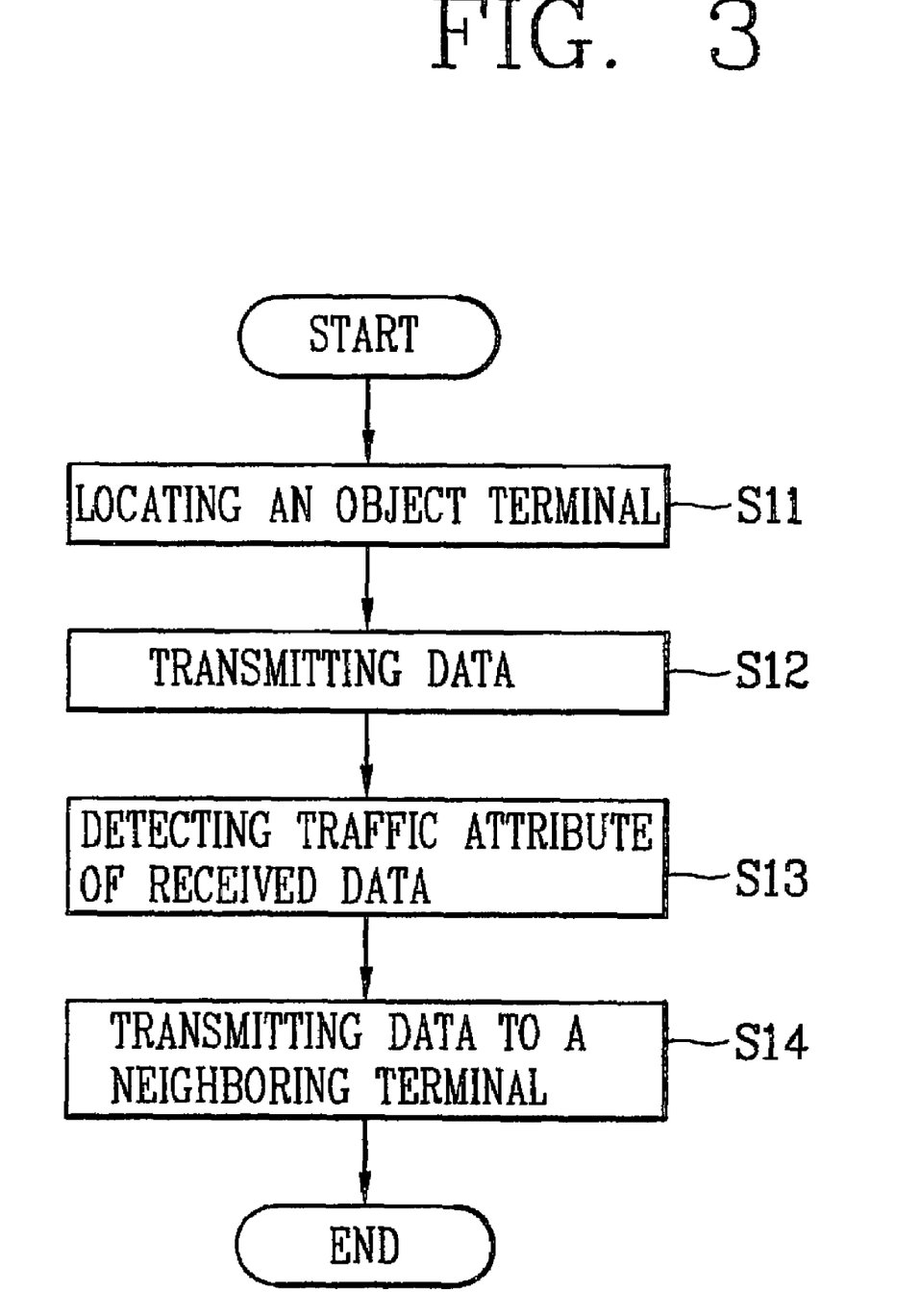
FIG. 3 illustrates a flow diagram for a method for transmitting data in an ODMA system, according to one embodiment of the present invention.

FIG. 3 is a flow chart illustrating a method for transmitting data in an ODMA system according to one embodiment of the present invention. The method comprises: locating an object terminal 101(S11) to which the data is transmitted; transmitting the data (S12); detecting traffic attribute of received data (S13) by a mobile terminal 101; and transmitting the data to a neighboring terminal 101 (S14) according to the traffic attribute.

The traffic attribute provides the real-time property or non real-time property of transmission data which is indicative of the degree of priority associated with the data. Accordingly, if the data has the real-time attribute, the transmission power is increased and the data is transmitted through more distant neighboring terminals. If the data has non real-time attribute, the transmission power is reduced and the data is transmitted through closer neighboring terminals.

In order to transmit the data in the ODMA system, neighboring terminals 101 which can be used as the repeaters are located. Locating the neighboring terminals comprises exchanging search messages including information of the respective mobile terminals 101 in the cell through an ODMA random access channel (ORACH) with another mobile terminal 101; and a step of forming connectivity tables using the exchanged searching messages by respective mobile terminals 101. The connectivity table includes path setting information by which the data is transmitted between the mobile terminals 101.

Table 1 shows an example of a search message exchanged between the mobile terminals, in accordance with one embodiment.

TABLE 1

| | |
|---|---|
| Sending ID | ID of a transmitting mobile terminal |
| Receiving ID | ID of a receiving mobile terminal (0 in case of broadcast) |
| TxPower | Transmission power of mobile terminal |
| Local path loss | Path loss between transmitting mobile terminal and receiving mobile terminal |
| Neighbor data list (ID + Tx_power_requd + Neigh_flag) | List of neighboring terminals having path setting information for the mobile terminal -ID:ID of neighboring terminal -Tx_power_requd: power required to reach to the neighbor terminal -Neigh_flag: type of neighboring terminal (for example, direct neighbor, indirect neighbor or destination ID) |

In case that the search message is transmitted to a certain mobile terminal 101, the ID of the mobile terminal 101 is the Receiving ID. In case that the search message is transmitted to unspecified plurality of mobile terminals 101, the Receiving ID includes a '0' value, for example.

Also, the Neighbor Data List includes the list of neighboring terminals which have the path setting information for the mobile terminal 101, and the neighboring terminal list includes IDs of neighboring terminals, power to reach to the neighboring terminal (Tx_power_requd) and the type of neighboring terminal (Neigh_flag), etc. Therefore, path information of a neighboring terminal which is apart as two hops using the list of neighboring terminals.

Table 2 shows an example of connectivity table formed by the search message transmitted/received between the mobile terminals, in accordance with one embodiment.

TABLE 2

| ID of neighboring terminal | NID_1 | NID_2 | ... | NID_n |
|---|---|---|---|---|
| Transmission power | Tx1 | Tx2 | ... | Txn |
| Timestamp | T1 | T2 | ... | Tn |

The connectivity table represents the data related to neighboring terminals as a table form, and the data includes the electric power required to reach the neighboring terminal and timestamp of a search message recently received from the neighboring terminal. In addition, the connectivity table is constructed based on the search message exchanged between the mobile terminals 101, and therefore, it is upgraded regularly and time information at that time is recorded on the timestamp.

When the mobile terminal 101 transmits data sets, the mobile terminal 101 decides to which mobile terminal 101 among the neighboring terminals 101 the data will be transmitted, based on the transmission power of the connectivity table and destination ID.

Figure 4:
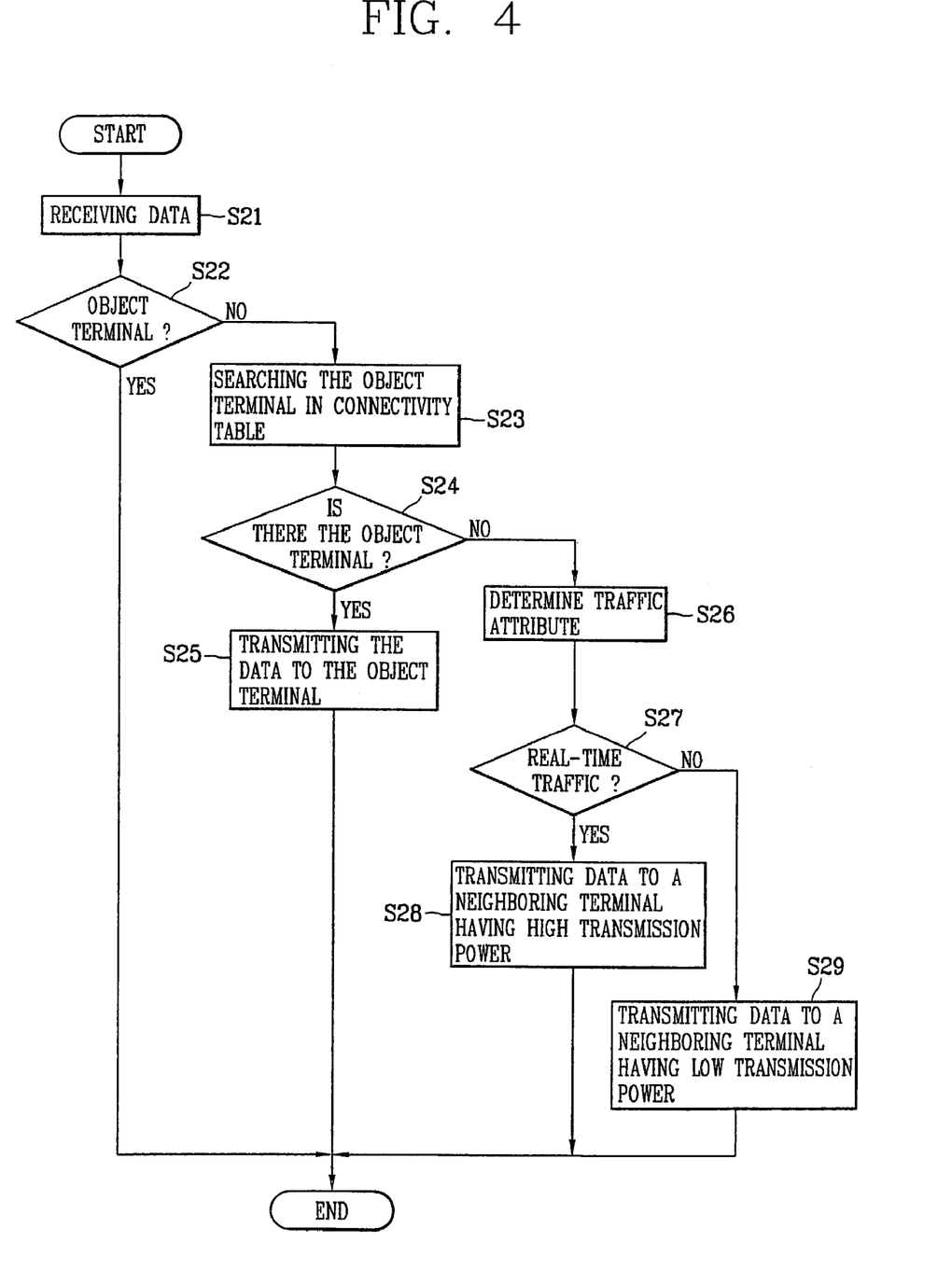
FIG. 4 illustrates one embodiment of the data transmitting method for the ODMA system, according to the invention.

FIG. 4 shows a first embodiment of the data transmitting method in the ODMA system according to one embodiment of the present invention. The mobile terminal 101 or the base station 102 transmits the data to unspecified plurality of neighboring terminals after locating the object terminal to which the data will be transmitted (not shown). At that time, the mobile terminals 101 are able to transmit/receive real-time data and non real-time data.

The mobile terminal 101 which received the data (S21) from the mobile terminal 101 or the base station 102 decides whether or not the terminal itself is the object terminal to which the data will be transmitted (S22). Data transmission ends when it is decided that the terminal 101 itself is the object terminal.

However, if the mobile terminal 101 which received the data is not the object terminal, the terminal 101 determines whether there is an object terminal ID in a neighboring terminal list in the connectivity table that is stored in the mobile terminal 101 (S23). The object terminal ID is located in the neighboring terminal list by searching the connectivity table (S24). Thereafter, the mobile terminal 101 transmits the object terminal directly, if the object terminal ID is in the neighboring terminal list (S25).

If there is no object terminal ID in the neighboring terminal list, the data is transmitted to the object terminal by way of another terminal 101. Therefore, the mobile terminal 101 determines the traffic attribute of the data through QoS (Quality of Service) class of the received data (S26) to decide whether or not the received data has a real-time traffic attribute (S27).

The QoS class can be referred to as 'traffic class', and can be divided into a conversational class, streaming class, interactive class and background class according to the degree of delay sensitivity that can be tolerated in each situation. The conversational class and the streaming class require real-time traffic. The interactive class and the background class may be satisfied by non real-time traffic. In addition, the conversational class is most delay sensitive and the background class is most tolerant.

The conversational class mainly corresponds to the voice communication, and is required in internet and multimedia application fields such as voice communication using an internet protocol (IP) and voice related tools. Also, the conversational class connects users in real-time, and therefore requires low delay rate and low error rate.

The streaming class mainly corresponds to real-time video communication, and it is mainly one-way communication transmitting data to a terminal of a user and has higher data delay rate than that of the voice communication.

The interactive class corresponds to a communication requiring response within a certain time period such as web browsing. And the background class corresponds to communication which does not require a response in a certain time period such as e-mail and short message service (SMS).

In some embodiments, the mobile terminal 101 determines the QoS class of the received data, and regards the message as real-time traffic if the message is conversational class or the streaming class related to the voice communication and the video data. However, if it is decided that the traffic of the corresponding message is the interactive class or the background class related to the web browsing, e-mail and the SMS, the message is regarded as the non real-time traffic.

When the traffic attribute of the received data is decided as the real-time traffic, the data is transmitted to a mobile terminal 101 having high transmission power in the neighboring terminal list of the connectivity table stored in the mobile terminal 101 (S28). Since the real-time data requires short transmission time and low delay rate, the real-time data is ideally transmitted by way of a rout having the smallest number of neighboring terminals 101. Therefore, the mobile terminal 101 having high transmission power is able to rapidly transmit the data in long distances between a small number of intermediate mobile terminals.

However, if it is decided that the traffic attribute of the transmitted data is the non real-time traffic, the data is transmitted to a plurality of closely located intermediate neighboring mobile terminals 101 having low transmission power as provided in the neighboring terminal list stored in the mobile terminal 101 (S29). The non real-time data is more delay tolerant, and therefore, the data is transmitted by way of a plurality of neighboring terminals 101 having low transmission power. This ensures minimum stability for data transmission.

As described above, the transmission power is controlled according to the priority of the received data, and therefore, the data is transmitted as according to the respective traffic attributes.

Figure 5:
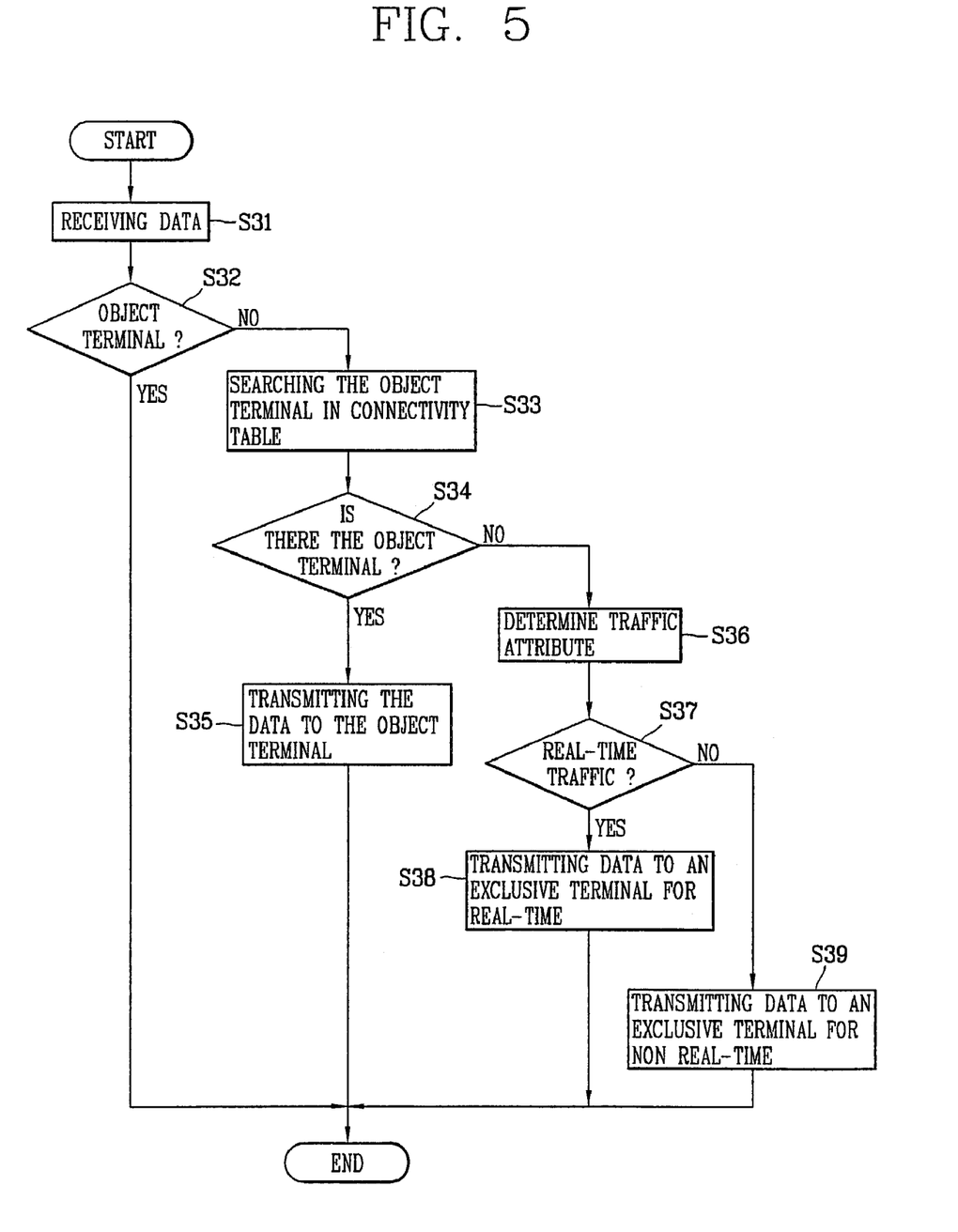
FIG. 5 illustrates a second embodiment of the data transmitting method for the ODMA system, according to the present invention.

FIG. 5 shows a second embodiment of the data transmitting method in the ODMA system according to one embodiment of the present invention. The mobile terminal 101 or the base station 102 transmits the data to an unspecified plurality of neighboring terminals after setting an object terminal to which the data will be transmitted (not shown). At that time, the mobile terminals 101 are classified into the exclusive terminals for real-time and the exclusive terminals for non real-time data transmission.

A mobile terminal 101 receives the data (S31) from the mobile terminal 101 or the base stations 102 and decides whether or not the terminal itself is the object terminal to which the data will be transmitted (S32), and ends the data transmission process when the terminal 101 itself is the object terminal.

However, when it is decided that the mobile terminal 101 which received the data is not the object terminal, the terminal 101 searches for an object terminal ID in the neighboring terminal list of the connectivity table stored in the terminal 101 (S33). After identifying the object terminal ID in the neighboring terminal list by searching the connectivity table (S34), the data is transmitted to the object terminal directly from the terminal 101 if the object ID is in the neighboring terminal list (S35).

If the object terminal ID is not in the neighboring terminal list, the terminal 101 determines the traffic attribute of the data through the QoS class of the received data (S36) to decide whether or not the received data has a real-time traffic attribute (S37).

If it is decided that the traffic attribute of the received data is the real-time traffic, the data is transmitted to the exclusive terminal for real-time traffic in the neighboring terminal list of the connectivity table stored in the terminal 101 (S38). Since the exclusive terminal for real-time has high transmission power so as to correspond to the real-time data transmission, the data is transmitted in one transmission over long distances.

However, if the traffic attribute of the received data is the non real-time traffic, the data is transmitted to the exclusive terminal for non real-time traffic in the neighboring terminal list stored in the mobile terminal 101 (S39). The exclusive terminal for non real-time transmits the non real-time data, which is relatively delay tolerant, by way of a plurality of closely located neighboring terminals 101 using low transmission power.

As described above, the data is transmitted through the exclusive terminals for real-time and for non real-time traffic by determining the real-time traffic or non real-time traffic attribute of the received data, and thereby a problem of limited radio network resource can be solved.

As described above, the method for transmitting data in the ODMA system according to the present invention is able to improve the efficiency of power consumption by determining the traffic attribute of the data transmitted/received between mobile terminals and by controlling the transmission power according to the traffic attributes.

Also, according to the data transmitting method for the ODMA system of the present invention, the transmission power is adjusted according to the real-time and non real-time data and the data is transmitted through the exclusive terminal, and thereby the communication efficiency can be improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for transmitting data in an opportunity driven multiple access (ODMA) system, the method comprising:
   receiving data to be transmitted to a first communication device;
   detecting a traffic attribute of the data; and
   transmitting the data to a second communication device neighboring the first communication device in a selected path based on the traffic attribute,
   wherein the traffic attribute comprises information that indicates that the data is delay-sensitive data such that a determination can be made to select the second communication device from a set of communication devices in the ODMA system that can satisfy transmission requirements associated with the delay-sensitivity of the data.

2. The method of claim 1, wherein a search message is exchanged between a plurality of mobile communication terminals in the path to determine availability of at least one neighboring mobile communication terminal.

3. The method of claim 2, wherein the search message comprises a list of the at least one neighboring mobile communication terminal, a first ID of a transmitting terminal transmitting the data, a second ID of a receiving terminal for receiving the data, transmission power, and information about the at least one neighboring mobile communication terminal in a path.

4. The method of claim 3, wherein the search message is a reference in a connectivity table utilized by an intermediate mobile communication terminal situated in the path between the transmitting terminal and the receiving terminal.

5. The method of claim 4, wherein the connectivity table is updated at predetermined time intervals, wherein time information at each update interval is stored in a timestamp.

6. The method of claim 1, wherein the step of transmitting the data comprises:
   transmitting the data to a neighboring mobile communication terminal having a first transmission power, if the traffic attribute indicates that the received data has a first delay sensitivity; and
   transmitting the data to a neighboring mobile communication terminal having a second transmission power, if the traffic attribute indicates that the received data has a second delay sensitivity.

7. The method of claim 1, wherein the step of transmitting the data comprises:
   transmitting the data to a neighboring mobile communication terminal in a first transmission distance, if the traffic attribute indicates that the received data has a first delay sensitivity; and
   transmitting the data to a neighboring mobile communication terminal in a second transmission distance, if the traffic attribute indicates that the received data has a second delay sensitivity.

8. The method of claim 1, wherein the step of transmitting the data comprises:
   transmitting the data to a first terminal for delay-sensitive data, if the traffic attribute indicates that the received data has a first delay sensitivity; and
   transmitting the data to a second terminal, if the traffic attribute indicates that the received data has a second delay sensitivity.

9. A method for transmitting data in an ODMA system comprising:
   exchanging a search message between a plurality of mobile terminals in an ODMA system;
   configuring a connectivity table including a neighboring mobile communication terminal list based on the search message;
   receiving data for transmission to an object terminal;
   determining a traffic attribute for the data;
   searching the connectivity table for a neighboring mobile communication terminal with a first transmission power, when the traffic attribute indicates delay-sensitive data;
   searching the connectivity table for a neighboring mobile communication terminal with a second transmission power, when the traffic attribute indicates delay-tolerant data; and
   transmitting the data to the neighboring terminal,
   wherein the neighboring terminal can satisfy transmission requirements associated with the traffic attribute designated for the data.

10. The method of claim 9, wherein the connectivity table is updated in response to receiving the search message.

11. A method for transmitting data in an ODMA system, the method comprising:
   exchanging search messages between a plurality of mobile terminals in an ODMA system;
   configuring a connectivity table including a neighboring mobile communication terminal list through the received search message;
   receiving a message for transmission to a neighboring mobile communication terminal;

determining a traffic attribute of the received message;
searching for an exclusive terminal for handling real-time messages in a neighboring mobile communication terminal list, when the traffic attribute of the message indicates real-time traffic;
searching for an exclusive terminal for handling non real-time messages in a neighboring mobile communication terminal list, when the traffic attribute of the message indicates non real-time traffic; and
transmitting the message to the exclusive terminal, if found,
wherein the exclusive terminal can satisfy transmission requirements associated with the traffic attribute designated for the data.

12. The method of claim 11, further comprising updating the connectivity table in response to receiving the search message.

* * * * *